United States Patent Office 3,582,290
Patented June 1, 1971

3,582,290
METAL EXTRACTION PROCESS
Robert R. Grinstead, Walnut Creek, Calif., assignor to
The Dow Chemical Company, Midland, Mich.
No Drawing. Continuation-in-part of application Ser. No.
553,698, May 31, 1966. This application Apr. 15, 1968,
Ser. No. 721,192
Int. Cl. B01d 11/00; C22b 59/00, 61/04
U.S. Cl. 23—340                                    12 Claims

ABSTRACT OF THE DISCLOSURE

A novel process for stripping metal cations from an organic extract containing such ions in association with anions of an organic acid extractant for metal cations and having in admixture therewith a substantially aqueous insoluble amine wherein the pH of the extract before carrying out the stripping operation is such that the amine is in its free base form. The metal ions are stripped from the extract with weaker acids than are conventionally used by contacting the extract with an acidic system of an acidity such that the amine is converted to its protonated form, i.e. to a substituted ammonium ion, whereupon the metal ions are ejected from the organic extract into the stripping media by the resulting substituted ammonium ions.

---

This application is a continuation-in-part of patent application Ser. No. 553,698, filed May 31, 1966, now abandoned.

This invention relates to the recovery of metal values and more particularly is concerned with a novel process for recovering metal values (i.e. metal ions) which have been extracted from aqueous source materials using a solvent extraction and stripping technique.

A number of conventional solvent extraction processes for recovering metal values from aqueous leach solutions, waste liquors, natural and synthetic brines, process streams and the like involve the extraction of the metal ions with an acidic (i.e. containing a dissociable proton) organic reagent. To illustrate: uranium, thorium, titanium and other higher valance metal ions are extracted by alkyl phosphoric acids. Nickel and cobalt values are recovered from aqueous systems with organic sulfonic acids; beryllium is extracted by carboxylic acids. In such processes, the so-extracted metal values usually are stripped from the organic phase by use of a relatively concentrated solution of a strong acid which merely reverses the extraction equilibrium.

With some extractions, because of a specific ability to preferentially complex or chelate one or more particular metal ions, selectivity also is achieved during the extraction. In some cases, the use as extractants of compounds which have an unconventional donor group or groups also provides selectivity of metal ion extraction in solvent extractant processes. For example, both the tetraphenylboride and the dipicrylaminate anions have been found to extract selectively alkali metal ions present in admixture with other cationic species. Further, within the alkali metals themselves, these anionic extractants are selective for the larger cations. These extractants are especially suitable for separating and recovering cesium when present in admixture with other metallic ions. However, recovery of the so-extracted metal ions from these materials can be a problem. Although it is possible to use strong mineral acids to strip metal values from an organic phase having dipicrylaminate as extractant, tetraphenylboride ion is decomposed by conventionl stripping concentrations of mineral acid and its extractive ability thus destroyed.

It is a principal object of the present invention to provide a novel process for stripping metal values from loaded organic extracts with weakly acidic materials.

It is also an object of the present invention to provide a novel metal ion recovery process which is operable in systems employing extractions which are detrimentally affected by strong mineral acids as are employed as stripping agents in many conventional metal ion recovery processes.

It is a further object of the present invention to provide a novel metal extraction process which gives selectivity of metal ion extraction.

It is another object of the present invention to provide a novel organic extraction process for metal value recovery wherein reduced amounts of stripping agents are required than are needed in conventional processes practiced heretofore.

These and other objects and advantages will become apparent from the detailed description presented hereinafter.

In general, the present novel process comprises providing a loaded organic extract comprising metal ions associated with an anion component capable of extracting metal cations from an aqueous metal ion containing source, said extract having a substantially aqueous insoluble amine in admixture therewith, the pH of the extract system being maintained such that the amine is held in its free base form, stripping the metal values from the loaded, amine-containing extract by contacting the extract with an acidic system of acidity sufficient to convert the amine to a protonated form (amine·H+) and recovering the metal values.

Usually in the practice of the present novel process a metal ion containing aqueous source material is contacted with a solution of a substantially aqueous insoluble amine and a substantially aqueous insoluble extractant for metal cations comprising an organic acid anion associated with a displaceable cation, while maintaining the pH of the system such that the amine is held in its free base form. The resulting organic extract is separated from the residual aqueous phase. The metal values, which are less strongly retained in the organic phase than the protonated form of the amine employed, are stripped from this extract by contact with an acidic system having sufficient acidity to convert the amine to its protonated form. The metal depleted organic phase, which now is comprised of the organic acid anion associated with a substituted ammonium cation, and the metal value containing acidic strip phase are separated. The so-separated metal values can be recovered from the acidic stripping system by crystallization, precipitation and filtration or other techniques known to one skilled in the art. Also, in certain instances, an aqueous solution of metal values can be used directly for the preparation of other compounds or put to other uses.

The operation of the present process can be summarized and illustrated by showing the various active species which are present in the organic phase during the various stages. These are as follows:

Before contacting the organic extractant with a metal ion ($M^{positive}$, e.g. $M^+$, $M^{++}$, $M^{+++}$ etc. and herein referred to simply by the symbol $M^p$. It is intended that both univalent and polyvalent cations are encompassed by this term) containing aqueous source material, the organic phase contains the anion of an organic acid together with a displaceable cation, such as $Na^+$, and the substantially insoluble amine in free base form.

After contact of an organic extractant with an aqueous metal ion ($M^p$) containing source material thereby to extract the $M^p$ ions into the organic phase, the resulting extract now comprises as active components (organic acid anion)⁻, ($M^p$ ions) and the amine which is still in its free base form.

The $M^p$ ions are stripped from the extract as set forth hereinbefore using a weakly acidic stripping system leaving in the organic phase the organic acid anion and the protonated amine (H·amine)⁺ ion which ejected the metal value cation.

The extractant generally is regenerated separately or in situ by treating it with base to establish a pH such that the protonated amine again is converted to its free base form and the organic acid anion is associated with the cation of the regenerating base. It particularly should be noted that the displacement of protons ($H^+$) by $M^p$ ions does not occur to any appreciable extent in the present novel process and a species such as (organic acid anion)⁻, (amine·$M^p$) is not present during any stage of the operation.

An advantage of the present system is that the amine can be regenerated as set forth directly hereinbefore and the organic extractant can be recycled for reuse.

In the practice of the present invention, ordinarily a metal ion ($M^p$) containing aqueous source material is contacted with a solution of a substantially aqueous insoluble amine and a substantially aqueous insoluble salt product from the reaction of an organic acid with a base, the cation of which is replaceable by metal value ions $M^p$, in a substantially water-immisicble solvent. This is done within a temperature range of from about 10° to about 90° C. while maintaining the pH at from about 2 to about 14, the pH for a given system being further controlled such that the amine component of the extractant is in its free base form.

The extract ordinarily is comprised of an organic solution having a water immiscible organic acid derived anion component associated with a displaceable cation and selected from the group consisting essentially of tetraphenylboride and alkylated aryl sulfonates having from about 10 to about 40 carbon atoms. This extractant also contains a substantially aqueous insoluble amine component selected from the group consisting essentially of aliphatic amines, aromatic amines and alkyl pyridines, this amine component further being characterized as having from about 10 to about 40 carbon atoms and exhibiting a pK less than the pH of the aqueous phase during the extraction; $pK_A$ being the apparent acid dissociation constant of the protonated amines as measured in an aqueous phase in intimate contact with it. This extractant mixture usually is carried in an organic liquid solvent material which also is substantially immiscible with aqueous systems and which dissolves the extractant organic acid, the amine in both its free and protonated forms and metal salts of the extractant acid.

Subsequent to the extraction of metal values from the aqueous system by contact with the salt of the organic acid extractant, the organic and aqueous phases are separated.

The resulting metal value containing organic extract is contacted with an acidic component to provide a pH at a minimum of at least about 1 pH unit, usually at least about 2 pH units, and preferably at least about 3 pH units lower than the pH of the system during the original extraction and which further is predetermined to assure conversion of the amine component of the extractant to a protonated form thereby to displace the extracted metal ions from the organic phase. Conveniently, an aqueous solution of a weakly acidic material is employed to strip the metal values from the organic extract. However, it is not necessary to have a separate water phase for this operation. To illustrate; in those operations wherein sufficient water is dissolved in the solvent solid salt products such as alkali metal bicarbonate can be recovered by introducing carbon dioxide directly into the system. Further, with acidic gases such as hydrogen chloride, a solid metal salt product can be realized by contacting even a substantially water-free organic extract with the gas.

Following the stripping of the metal values, the organic extractant can be recycled for reuse.

The quantity of the organic acid anion employed at a minimum is that required to recover a predetermined quantity of metal ions. The amine component is employed in sufficient quantity such that in the stripping operation the protonated amine replaces the metal ions extracted by the organic acid anion component in the extract. In those systems where no solvent is employed, at least one of the members, i.e. the extractant salt of the organic acid or the amine component, are selected from those materials which provide a liquid phase. Additionally, in this later type of operation, sufficient volumes and quantities are used to assure ready handling and dissolution of each of the salt species formed during the process.

In a preferred embodiment of the present invention, an alkylated organic aryl sulfonate of from about 20 to 30 carbon atoms or a tetraphenylboride as the metal ion extractant and a primary aliphatic amine of the type set forth hereinbefore and having from about 18 to 30 carbon atoms are dissolved in an organic solvent to provide a substantially water immiscible solution. An aqueous solution of metal ions having a metal ion concentration of from about 0.1 to about 1 molar is contacted at a temperature of from about 20 to about 60° C. and at a pH of from about 6 to about 14, the pH range being further controlled so as to maintain the amine in its free base form, thereby to extract metal values into the organic phase. After separation of the organic extract from the residual aqueous source material (raffinate) the resulting extract is contacted with an aqueous system at a pH of at least about 3 pH units lower than the pH of the raffinate and sufficient to convert the amine to its protonated form, thereby to strip the so-extracted metal values from the extract.

As has been indicated hereinbefore, successful operation of the present novel extraction process involves controlling the pH of the aqueous phase of the reaction mass, particularly during the extraction stage, such that this is higher than the $pK_A$ of the protonated amine in the recycled extractant solution. For optimum utilization of the organic acid anion in extracting the metal values, there should be substantially complete conversion of the protonated amine salt to the free base in the recycled organic phase. Adjustment and control of the pH of the extraction mixture (as measured in the aqueous phase) can be carried out by a variety of methods as known and understood by one skilled in the art. Conveniently, base can be added directly to the aqueous mixture containing the metal values to be extracted. In other cases, in order to simplify manipulative operations at this stage, prior treatment, i.e. pH adjustment, of either recycled stripped organic extract or aqueous metal source material can be employed.

The present process can be carried out to recover any metal ions which are less strongly held by the organic acid anion in the extract than is the substituted ammonium cation resulting during the stripping operation. It has been found to be particularly suitable for the stripping and recovery of univalent metal ions, e.g. less common alkali metals, silver and copper, as well as alkaline earth metals and rare earths from their associations in amine-containing extracts with anions of organic acids.

Organic materials generally suitable as a source of the anion component of the extractant salt are those acidic organic materials having one or more anions which more strongly associate with the more valuable metal ions and which exhibit a preference for large cationic species. Further, these must be capable of reversibly associating with substituted ammonium cations thereby releasing the previously extracted metal ions associated therewith. Specific examples of operable organic anions are listed directly hereinafter.

(I) Large negative anions having no available complexing groups, e.g. tetraphenylboride ion.

(II) Anions which show little or even no complexing ability by virtue of the charge being delocalized by resonance, e.g. dipicrylaminate ion.

(III) Anion providing systems where the negatively charged group is used alone or solvated by other solvating groups, i.e. sulfonates.

Amines suitable for use in the present process are those substantially water immiscible materials having at least about 6 carbon atoms, preferably from about 18 to 30 carbon atoms. which exhibit sufficient basic character to be capable of forming salts with organic acids such as tetraphenyl boric and sulfonic acids. Branched and straight chain primary, secondary and tertiary alkyl, alkenyl and cycloalkyl amines preferably are employed although mixed aliphatic-aromatic amines having one or two aromatic groups on the nitrogen also are operable. Further, other aromatic type amines such as the substantially water-insoluble heterocyclic amines, e.g. substituted pyridines, also can be employed. The choice of a particular amine for a specific operation will depend to some extent on the operating conditions present. The stability of the amine molecule under high temperature, or the reactivity of unsaturated carbon to carbon bonds under certain conditions, for example, among other criteria will determine the choice of specific amine to be employed in a given system. Specific operable amines include, for example, N,N-dibutylaniline, dioctylphenylamine, dodecylaniline, tetradecylamine, Primenes (tertiary alkyl amines having from about 12 to about 24 carbon atoms), trioctylamine and the like. As set forth hereinbefore, for operability in a particular system, the protonated form (amine·H)+ of the amine used must have a p$K_A$ (as previously defined herein) which is lower than the pH of the aqueous phase of the system during the extraction.

The amine-organic acid salt extractant can be used directly to recover metal values in accordance with the present novel process. However, advantageously as discussed hereinbefore, the extractant is carried in a suitable solvent or diluent.

Substantially water immiscible alcohols, esters, ketones, hydrocarbons, halogenated hydrocarbons and the like organic liquids which possess the requisite solvent properties as set forth hereinbefore are suitable for use as solvents for the described extractant system in the practice of the process of the present invention. In order to assure dissolution of all species desired to be dissolved that are present in a system, solvent mixtures may be employed. For example, with relatively non-polar solvents, such as hydrocarbons or chlorinated hydrocarbons, polar compounds of low water solubility such as methylisobutyl ketone are incorporated into the system to assure dissolution of all desired species in the organic phase.

With certain extractants, such as tertaphenylborides, relatively polar materials, e.g. methyl ethyl ketone, methyl isobutyl ketone and the like usually are employed as solvent. These solvents generally are employed when these salts are used to extract the larger alkali metal cations as the heavier alkali metal salts of tetraphenyl boric acid are relatively insoluble in the more non-polar media.

In general, the selection of a particular solvent or solvent system for use in an actual extraction operation will be determined to assure that it exhibits the requisite solubility characteristics as set forth hereinbefore and does not detrimentally interact or react with or ortherwise adversely influence the other components of the extractant mixture under the operating conditions.

For the stripping operation, the operable pH of the system readily is achieved and controlled. Conveniently, carbon dioxide, sulfur dioxide or hydrogen chloride (each of which forms an acid with water), dilute sulfuric acid, acidic salts such as, for example, sodium hydrogen sulfate, sodium dihydrogen orthophosphate, phosphoric acid and the like can be used to adjust the pH in the stripping operation. Desirably to assure substantially no degradation of the organic anion component of the extractant, the more weakly acidic stripping agents are selected, these being further characterized, however, in that they impart an acidic character to the system sufficiently great to assure protonation of the amine component. Carbon dioxide has been found to be particularly effective when used in conjunction with alkali metals as this can be used to provide the corresponding alkali metal bicarbonate directly in a readily recoverable solid form.

The following examples will serve to further illustrate the present invention but are not meant to limit it thereto.

EXAMPLE 1

About 16 milliliters of a solution of 0.1 molar trioctylammonium tetraphenyl boride in methyl isobutyl ketone was prepared by mixing equivalent quantities of sodium tetraphenylboride and trioctylamine hydrochloride (Alamine 336 hydrochloride) in the ketone and removing the sodium chloride which percipitated. The resultant organic phase containing trioctylammonium tetraphenyl boride was stirred for about 10 minutes at room temperature with about 16 milliliters of an aqueous sodium chloride-potassium chloride solution containing 27.4 grams/liter of sodium (1.19 molar) and 37.1 grams/liter of potassium (0.95 molar) during which time aqueous sodium hydroxide solution (2.5 normal) was slowly added in order to liberate the free amine and form a tetraphenyl boride extractant. The agitation then was stopped whereupon the system separated into two phases. The pH of the aqueous phase was determined; this was 9.5 and sufficient such that the amine was present in its free base form. The organic extract phase was separated from the residual sodium chloride-potassium chloride source material. After this separation, about 4 milliliters of water was mixed with the organic extract. While stirring the mixture, carbon dioxide was bubbled through the system for about 10 minutes at room temperature. The final pH of the resultant system was 5.5.

Analysis of the aqueous stripping solution after separation from the organic extract showed this to be 0.099 molar in sodium ion and 0.31 molar in potassium ion showing that both metal cations were ejected by the trioctylammonium cation.

The extraction coefficient $K_{Na}$ for sodium $$\left(K_{Na} = \frac{[Na] \text{ loaded org.}}{[Na] \text{ aq. raffinate}}\right)$$

is 0.21 and for potassium $$\left(K_K = \frac{[K] \text{ loaded org.}}{[K] \text{ aq. raffinate}}\right)$$

is 0.81. This indicates the selectivity $$\left(\frac{K_K}{K_{Na}}\right)$$

of potassium over sodium for this particular system is 3.9 or that Na+ is displaceable from its association with tetraphenyl boride anion by K+.

The stripped and separated organic extractant solution was stirred at about room temperature for about 10 minutes with 16 milliliters of a 1.8 molar sodium chloride-0.2 molar cesium chloride solution during which time aqueous sodium hydroxide solution (2.5 normal) was added to the mixture to regenerate the amine to its free base form from the protonated form produced during the stripping operation. The final pH of the extraction system was 9.6. The organic extract and residual aqueous source material were separated and the organic phase stripped with 4 milliliters of water in the presence of a stream of carbon dioxide gas. For this operation, the water-organic extract-carbon dioxide mixture was stirred together for about 2 hours. The resulting aqueous and organic phases were separated and the stripping procedure repeated with a fresh 4 milliliter portion of water and stream of carbon dioxide.

The resulting aqueous strip system had a pH of about 5.5. Analysis of the combined aqueous strip solution after separation from the organic extractant showed a cesium concentration of 0.42 molar and sodium of 0.30 molar. The respective extraction coefficients, therefore, are $K_{Cs}=0.58$ and $K_{Na}=0.029$. The selectivity of cesium over sodium for this system was 20.

These studies clearly demonstrate the fact that the anion component of the extractant exhibits a useful selectivity for the heavier alkali metal cations and also shows the stripped organic extractant after treatment with base to convert the protonated amine to its free base form can be reused thus indicating operability in continuous extraction systems wherein the extractant is recycled.

EXAMPLE 2

About 20 milliliters of an aqueous 1 molar potassium chloride-1 molar sodium chloride solution were stirred for about 10 minutes with an extractant consisting of 0.05 molar trioctylammonium tetraphenylboride solution in a 50/50 volume mixture of methyl ethyl ketone-methyl isobutyl ketone. During this period a 2.5 normal aqueous sodium hydroxide was added to the system to form alkali metal tetraphenyl borides and to provide the amine in free base form at a final pH of about 9.5 for the aqueous phase of the reaction mass.

After separation of the organic extract and residual aqueous metal ion source solution (raffinate) about 17 milliliters of the metal loaded organic extract were treated with gaseous carbon dioxide in the presence of about 4 milliliters of water for about 10 minutes. After separation of the residual organic phase and the aqueous phase, the aqueous strip was analyzed and found to contain 1.01 grams per liter sodium and 2.35 grams per liter potassium or a potassium/sodium ratio of 2.33. The potassium/sodium ratio on a gram basis of the original metal ion source material was 1.22. This indicated a selectivity of potassium over sodium of 1.9 or that sodium tetraphenyl boride can be used to extract potassium even from brines 1 N in NaCl and that, in the presence of the free amine, the potassium and sodium can be stripped by an aqueous solution of an acid too weak to cause degradation of tetraphenyl boride anion. The pH of the acidic strip system was about 5.5.

A second 17 milliliter portion of the separated organic extract was treated directly with gaseous carbon dioxide for about 10 minutes. During this time, a white precipitate formed. Separation of this precipitate from the aqueous phase and subjecting it to chemical analysis indicated this to be about 60 mole percent sodium bicarbonate and 40 mole percent potassium bicarbonate.

EXAMPLE 3

About 50 milliliters of an aqueous 1 molar sodium chloride-1 molar potassium chloride solution were stirred for about 20 minutes with 50 milliliters of a kerosene solution which was 1 molar in a solvating agent, 4-sec-butyl-2-(alpha-methylbenzyl)phenol, 0.1 molar in Al-amine 336 amine and 0.1 molar sodium dinonylnaphthalene sulfonate. After separating the organic and aqueous phases about 20 milliliters of the organic extract (pH of about 11) was stripped in a conventional manner by stirring with an equal volume of 1 Normal aqueous hydrochloric acid for several minutes. Analysis of the resultant aqueous acidic phase indicated the potassium concentration to be about 0.054 molar and the sodium to be 0.012 molar. Since equal volumes of the stripping solution and the organic phase were utilized, these concentrations are the same as were present in the loaded organic extract. This study indicates the extraction coefficient for sodium was 0.012 and for potassium was 0.05 indicating a selectivity of potassium over sodium for the system of 4.

A second 20 milliliter portion of the organic extract was stripped according to the instant invention by bubbling carbon dioxide therethrough for about 2 hours in the presence of one milliliter of water. After separating the resultant two phases, about 0.7 milliliter of an aqueous phase was recovered which was found to contain the equivalent of about 7 grams per liter sodium and 53 grams per liter potassium. The total sodium and potassium concentration present in the aqueous phase is equivalent to about 0.06 molar total potassium and sodium ions present in the organic phase. The carbon dioxide acid strip (pH of about 5.6) of the organic extract achieved substantially complete removal of the potassium and sodium ions therefrom since the quantities present in the aqueous phase resulting from the carbon dioxide stripping operation were comparable to those stripped using the 1 normal hydrochloric acid stripping agent. In the carbon dioxide stripping operation, a white solid was found to be suspended in this phase which appeared from infrared analysis to be primarily potassium bicarbonate. The presence of this solid indicates that by using relatively small stripping volumes of water in the presence of carbon dioxide and the amine a highly concentrated aqueous product phase of alkali metal bicarbonates can be produced directly.

EXAMPLE 4

A kerosene solution which was about 0.1 molar in sodium dinonylnaphthalene sulfonate, 1.0 molar in 4-sec-butyl-2-(alpha-methylbenzyl)phenol and 0.1 molar Primene JM-T, an aliphatic branched chain primary amine having an equivalent weight of about 342, was stirred with an equal volume of an aqueous 1 molar potassium chloride-1 molar sodium chloride solution for 15 minutes at room temperature. The organic phase (pH of about 11), having the amine in its free base form, after separation from the residual aqueous ion source material was separated into two portions. The metal values were stripped from one portion by shaking with an equal volume of more conventional strength (1 molar, pH=0) aqueous hydrochloric acid for 1 minute. The other portion of the organic phase was striped by stirring for 10 minutes with an equal volume of water to which only enough hydrochloric acid had been added to bring the pH to 5.6. Analysis of the two hydrochloric acid strip product solutions showed the potassium and sodium concentrations to be substantially identical and complete in both cases. In the one molar hydrochloric acid molar strip, the potassium concentration was found to be 0.076 molar and the sodium 0.0096 molar. The 5.6 pH strip solution showed a potassium concentration of 0.075 molar and sodium of 0.0091 molar.

As a control, the above described extraction procedure was carried out except the amine was eliminated from the organic extractant. Attempts to strip the extracted metal values from the resulting organic extract using an aqueous hydrochloric acid solution as low as pH 2.3 indicated marked reduction in the stripping efficiency. With the 2.3 pH aqueous hydrochloric stripping solution, the potassium concentration in the acidic aqueous product solution was found to be only 0.019 molar and the sodium concentration was found to be only 0.007 molar. This study clearly indicates the importance of the amine component during the stripping stage as well as the effectiveness of the present process in the utilization of relatively weak acids for stripping metal values from an organic extract.

In a separate study utilizing a kerosene solution 0.1 molar in sodium dinonylnaphthalene sulfonate, 1 molar in 4-sec-butyl-2-(alpha-methylbenzyl)phenol and 0.095 molar in dodecyl aniline was contacted with an equal volume of an aqueous solution containing 0.5 molar potassium chloride and 0.5 molar sodium chloride for about 15 minutes at room temperature. The organic and aqueous phases were separated and about 10 milliliters of the organic extract (pH of about 8) wherein the amine was in its free base form, was stirred with 25 milliliters of an aqueous hydrochloric acid solution maintained at a pH of 3. After 3 minutes the aqueous acidic strip phase and residual organic extractant were separated. Analysis of the aqueous strip indicated sodium to be 0.015 molar and potassium 0.077 molar or a total of 0.092 molar. This shows substantially complete removal of the sodium and potassium values from the extract since the capacity of the organic phase for these values in the 10 milliliter sample was about 0.09 molar.

In a control run utilizing the same extractant and procedures except that the dodecyl aniline was not employed in the extractant, analysis of the pH 3 aqueous hydrochloric acid strip product solution showed sodium to be 0.009 molar and potassium 0.005 molar. This total of 0.014 mole stripped from the organic extract indicated only about 16 percent recovery.

EXAMPLE 5

About 25 milliliters of a kerosene solution which was 0.1 molar in sodium dinonylnaphthalene sulfonate, 0.083 molar in N,N-di(n-butyl)aniline and 1 molar in 4-sec-butyl-2-(alpha-methylbenzyl)phenol solvating agent was stirred for 15 minutes with an aqueous solution containing about 0.6 molar sodium chloride, 0.05 molar magnesium chloride and 0.01 molar in calcium chloride (this approximates the composition of sea water except for minor compounds). The organic phase (pH of about 8) then was separated from the residual aqueous metal ion source material (raffinate) and contacted with an aqueous hydrochloric acid strip solution at a pH of 2.9 whereupon the amine was converted from its free base into a protonated form and the metal ions ejected thereby into the aqueous acidic phase. Analysis of the strip solution after separation from the metal depleted organic extract indicated this to be 0.059 normal in sodium, 0.022 normal in magnesium and 0.007 normal in calcium. The total cations in the strip solution thus were 0.088 normal. The strip pH of 2.9 represents the end point in the conversion of the amine to the salt form. Substantially complete removal of the metal ions was indicated since the amine concentration was 0.083 normal. In a control repeating this study except that the amine was not used, an attempt was made to strip the metal values from the organic extract at a pH of 1.2. Analysis of the resulting aqueous acidic product solution indicated sodium 0.048 normal, magnesium 0.005 normal and calcium 0.001 normal. The total cations in the acid stripped product solution, therefore, were 0.054 normal or only about 65 percent of that realized by the practice of the present invention even though the pH of the strip solution was considerably lower.

EXAMPLE 6

About 25 milliliters of a 0.077 molar lanthanum chloride solution ($LaCl_3$) was stirred for 50 minutes at room temperature with an equal volume of 0.1 molar sodium dinonylnaphthalene sulfonate, 0.095 molar dodecyl aniline solution in kerosene containing 17 percent by volume isodecanol solvating agent. After separating the organic and aqueous phases, 25 milliliters of the organic extract (pH of about 8) having the dodecylaniline in its free base form was stirred with an equal volume of an aqueous hydrochloric acid solution maintained at a pH of 2.8. This converted the amine to its protonated form and stripped the metal values into the acidic stripping medium. Separation of the aqueous products strip solution and the lanthanum depleted organic extractant and analysis of this strip indicated this to be 0.029 molar in lanthanum. Analysis of the residual lanthanum depleted source material showed this to be 0.022 molar in lanthanum; the organic extract, therefore, being 0.055 molar in lanthanum. This indicated that about 51 percent of the lanthanum which had been extracted into the organic phase was stripped in a single pass.

A control study repeating this run but where the dodecylaniline was eliminated from the organic extract showed that with a lanthanum containing organic extract about 0.038 molar with respect to lanthanum, an acid strip product solution at pH of 2.4 showed only a lanthanum concentration of 0.001 molar. This indicates that only about 3 percent of the lanthanum in the organic extract was stripped therefrom.

Various modifications may be made in the present invention without departing from the spirit or scope thereof, and it is understood that I limit myself only as defined in the appended claims.

I claim:
1. A method for recovering metal ions from an organic extract containing such ions which comprises:
   (a) providing a substantially aqueous-immiscible organic phase comprising metal ions in association with an organic acid anion extractant for metal ions and a substantially aqueous insoluble amine, said organic acid anion extractant being a member selected from the group consisting of (i) tetraphenylboride and (ii) alkylated aryl sulfonate anions having from about 10 to about 40 carbon atoms and said amine being a member selected from the group consisting of aliphatic and aromatic amines having from about 10 to about 40 carbon atoms,
   (b) contacting said organic phase with an acidic stripping medium capable of protonating said amine thereby converting said amine to substituted ammonium cations in association with said organic acid anions and displacing said metal ions from said organic phase into said acidic stripping medium, and
   (c) separating the metal ion containing acidic stripping medium from the metal ion depleted organic phase extractant.

2. The process as defined in claim 1 and including the initial step of contacting a substantially aqueous-immiscible organic extractant with a metal ion containing aqueous source material thereby to provide a substantially aqueous-immiscible metal ion containing extract.

3. The process as defined in claim 1 wherein the amine is added to a substantially aqueous-immiscible organic extract comprising metal ions in association with said organic acid anion extractant thereby to prepare said substantially aqueous-immiscible organic phase.

4. The process as defined in claim 1 wherein the metal ions in said substantially aqueous-immiscible organic phase are members selected from the group consisting of alkali metals, alkaline earth metals and rare earth metals.

5. The process as defined in claim 1 wherein the substantially aqueous-immiscible organic phase contains an organic liquid solvent material, said solvent material being substantially aqueous insoluble and capable of dissolving the organic acid anion extractant, the amine, the protonated form of said amine, and the corresponding metal ion salts of said organic acid anion extractant.

6. The process as defined in claim 1 wherein the substantially aqueous-immiscible organic phase is comprised of an organic acid anion extractant for metal ions selected from the group consisting of alkylated aryl sulfonate anions having from about 20 to about 30 carbon atoms and tetraphenyl boride anion and the amine is a primary aliphatic amine having from about 18 to about 30 carbon atoms, said organic anion and amine being dissolved in a liquid organic solvent material which is substantially immiscible with the aqueous source material and which also dissolves the amine salt and metal ion salts of the extractant anion.

7. The process as defined in claim 1 wherein the acidic stripping medium is a weak acid, said weak acid providing a pH at least about 1 pH unit lower than the pH of the metal ion containing substantially aqueous-immiscible organic phase and sufficient to assure formation of the protonated form of the amine component of said substantially aqueous-immiscible organic phase, said weak acid being a member selected from the group consisting of carbon dioxide, sulfur dioxide, hydrogen chloride, dilute sulfuric acid, sodium hydrogen sulfate, sodium dihydrogen orthophosphate or phosphoric acid.

8. The process as defined in claim 7 and including the step of agitating the metal ion containing organic extract with an aqueous solution of said weak acid component while maintaining the pH at least 3 pH units lower than the pH of said metal ion containing extract.

9. The process as defined in claim 2 and including the step of contacting the metal ion depleted organic phase having said amine component in its protonated form with a quantity of a base sufficient to raise the pH that said amine is converted to its free base form.

10. The process as defined in claim 9 and including the step of recycling the metal ion depleted organic phase after converting the amine to its free base form and contacting said organic phase with additional metal ion containing aqueous source material.

11. The process as defined in claim 2 wherein the metal ion containing aqueous source material is contacted with the substantially aqueous-immisible organic extractant solution over a temperature range of from about 10 to about 90° C. while maintaining the pH at from about 2 to about 14 and wherein said extractant solution contains an organic liquid solvent material, said solvent material being substantially immisible with said metal ion containing aqueous source material and dissolving the acidic organic anion component, the amine, the protonated form of said amine and the corresponding metal ion salts of said acidic organic anion component.

12. The process as defined in claim 2 wherein the metal ion containing aqueous source material has a metal ion concentration of from about 0.1 to about 1 molar and is contacted with said organic extractant at a temperature of from about 20 to about 60° C. while maintaining the pH of the reaction mass at from about 6 to about 14 thereby to extract said metal ions into said organic extractant, and including the steps of separating the resulting metal ion containing substantially aqueous-immiscible organic phase from the residual aqueous source material and contacting the said organic phase with an aqueous acidic system at a pH of at least about 3 pH units lower than the pH of the organic phase thereby to strip the so-extracted metal values therefrom.

References Cited

UNITED STATES PATENTS

| | | | |
|---|---|---|---|
| 2,990,244 | 6/1961 | Brown et al. | 23—312 |
| 3,083,085 | 3/1963 | Lewis et al. | 23—312 |
| 3,156,524 | 11/1964 | Drobnick et al. | 23—312 |
| 3,295,932 | 1/1967 | Boutin et al. | 23—340 |
| 3,323,857 | 6/1967 | Bauer et al. | 23—312 |
| 3,360,344 | 12/1967 | Bourat | 23—340 |
| 3,409,415 | 11/1968 | Moore | 23—23 |

FOREIGN PATENTS

| | | | |
|---|---|---|---|
| 1,060,965 | 3/1967 | Great Britain | 23—340 |

LELAND A. SEBASTIAN, Primary Examiner

F. M. GITTES, Assistant Examiner

U.S. Cl. X.R.

23—23, 24, 32, 312; 260—429.1, 429.2